United States Patent Office 3,401,509
Patented Sept. 17, 1968

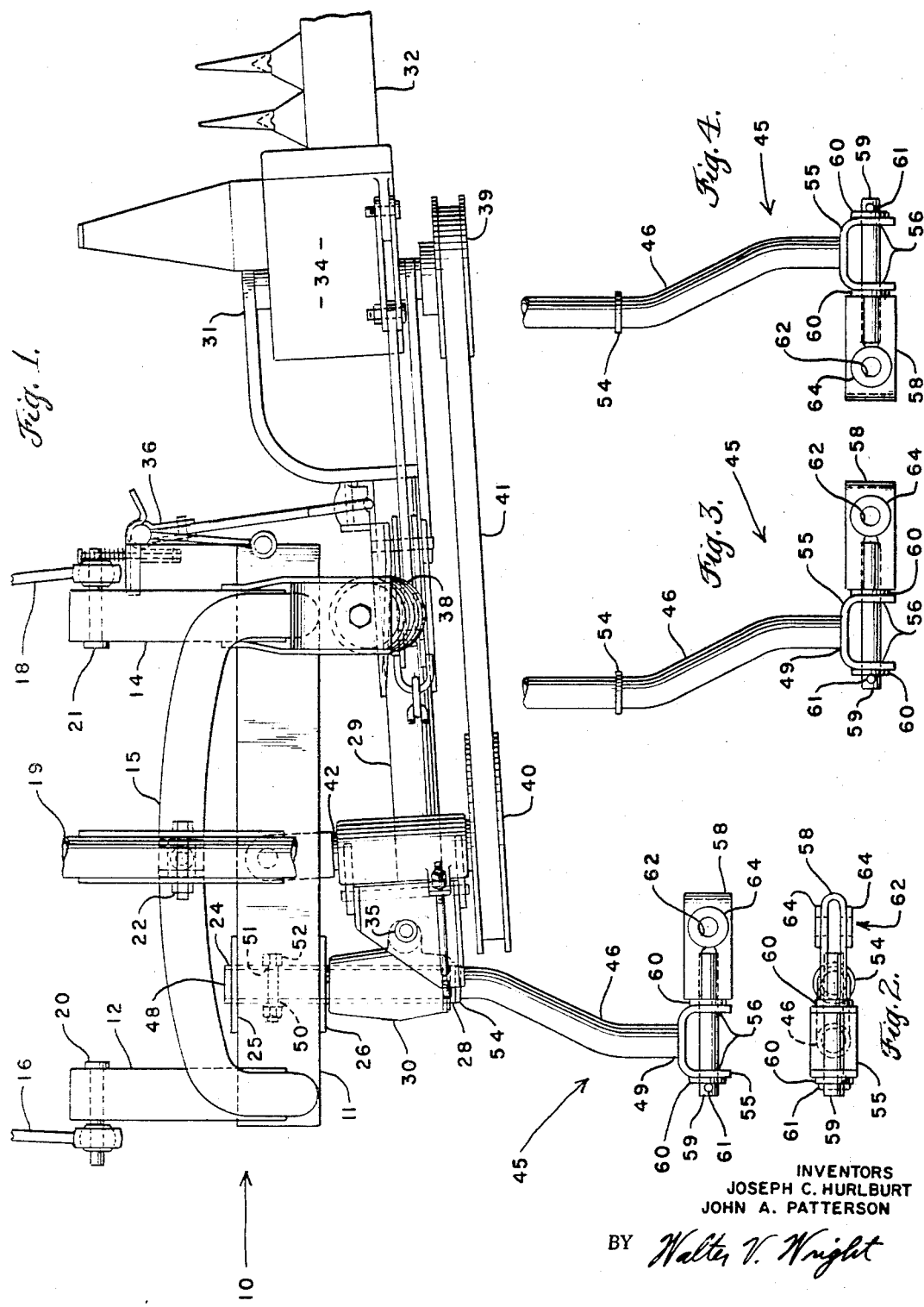

3,401,509
HITCH
Joseph C. Hurlburt, Leola, Pa., and John A. Patterson, Wingrave, Buckinghamshire, England, assignors to Sperry Rand Corporation, New Holland, Pa., a corporation of Delaware
Filed Jan. 4, 1966, Ser. No. 518,689
4 Claims. (Cl. 56—25)

This invention relates to agricultural mowers.

Agricultural mowers conventionally include a base frame which is attached to a tractor or the like. A mower cutterbar is carried by the base frame and projects laterally to one side of the frame and the tractor to which the frame is attached. This enables an operator to mow a crop without first running over it with the tractor. In recent years it has become a popular practice to tow a hay conditioner implement behind the same tractor upon which a mower is mounted. While the mower cutterbar is mowing a swath of hay alongside the tractor, the conditioner implement behind the tractor conditions the swath over which the tractor is travelling. This is the swath that was mowed on the preceding pass around the field. For best harvesting results, it is desirable to have the conditioner implement centered on the swath upon which it operates.

Mower cutterbars are manufactured in a variety of standard lengths, such as: five foot, six foot, and seven foot lengths, for example. A mower purchaser specifies the cutterbar length he desires. The cutterbars are interchangeably mountable on a single base frame. Since the mounting point on the base frame is the same for each of the cutterbars, it will be apparent that the center of a seven foot cutterbar (or the swath that it mows) is located six inches outwardly of the center of a six foot cutterbar and twelve inches outwardly beyond the center of a five foot cutterbar, relative to the base frame.

It is an object of this invention to provide a single hitch structure for trailing a hay conditioner implement behind a mower base frame which may be assembled and mounted at a fixed point on the base frame in a plurality of different ways to locate the conditioner hitch point selectively in the center of a previously mowed swath for any one of a plurality of standard length cutterbars with which the mower base frame may be provided.

It is another object of this invention to provide hitch mechanism, for trailing a crop conditioner implement behind a mower, which is rugged, mechanically simple, and capable of manufacture at low cost.

It is another object of this invention to simplify the manufacturing and parts handling and storage problems associated with the fabrication and retailing of combination mower-conditioner units having a range of standard cutterbar lengths while providing optimum conditioner hitch location for each of the standard length cutterbars.

These and other objects and advantages of this invention will be apparent upon reference to the following description and claims taken in conjunction with the accompanying drawings wherein:

FIG. 1 is a fragmentary plan view of a tractor mounted mower provided with a conditioner hitch mechanism constructed in accordance with the principles of the present invention;

FIG. 2 is a rear elevational view of the conditioner hitch device seen in FIG. 1;

FIG. 3 is a fragmentary plan view of the conditioner hitch device seen in FIG. 1 assembled in an alternate manner to provide a different conditioner hitch point from that shown in FIG. 1; and FIG. 4 is a fragmentary plan view of the conditioner hitch device seen in FIG. 1 and assembled in still another alternate manner to provide a third conditioner hitch point in addition to those seen in FIGS. 1 and 3.

Referring now to the drawings in detail, particularly FIG. 1, the reference numeral 10 indicates, generally, a mower base frame. The base frame 10 has a main transverse cross beam 11 with forwardly projecting arms 12 and 14 fixed thereto at the opposite ends of the beam. An inverted U-shaped mast 15 is mounted on main cross beam 11. The base frame 10 is attached to the left and right drawbars 16 and 18, respectively, and the upper stabilizer arm 19 of the convention 3-point implement hitch of a tractor by hitch pins 20, 21 and 22 which are respectively carried by the left and right frame arms 12 and 14 and the U-shaped mast 15.

A hollow circular pipe 24 is supported on the underside of main frame beam 11 by plates 25 and 26 which are affixed to the beam 11 and depend therefrom. Pipe 24 extends horizontally rearwardly to a rear terminal end 28 and constitutes a mounting pintle for the usual mower drag bar 29. The drag bar 29 is mounted on pintle 24 by a sleeve member 30 which is received over the rear terminal end 28 of pintle 24.

Drag bar 29 extends downwardly and laterally from the sleeve 30 to a bifurcated free end 31. The usual mower cutterbar 32 is attached to a mower driving head 34 which is mounted between the bifurcations of the free end 31 of the drag bar. Other conventional mower elements which do not enter into the present invention will be readily recognized in FIG. 1 of the drawings, such as: a drag bar breakaway pivot member 35, a drag bar breakaway latch mechanism 36, a drag bar supporting and balancing spring 38, and the usual mower drive train including pulleys 39 and 40, V-belt 41 and extension shaft 42 which extends forwardly from the drive pulley 40 to the power-take-off shaft (not shown) of the tractor.

As previously mentioned, the cutterbar 32 is generally manufactured in a variety of standard lengths. At the time of purchase, the dealer may attach whichever cutterbar length the purchaser desires to the mower driving head. The base frame, drag bar, and mower driving head are the same for each mower regardless of cutterbar length.

A hitch device for towing a crop conditioning implement behind the mower base frame is shown in FIG. 1 and indicated, generally, by the reference numeral 45. Hitch device 45 comprises a generally fore-and-aft extending pipe member 46 having a forwardmost end 48 (FIG. 1) and a rear terminal end 49. Pipe 46 is of circular cross section and is of a size to fit within drag bar mounting pintle 24.

Under mower base frame cross beam 11, a bolt hole 50 is provided extending transversely through drag bar mounting pintle 24. A similar transverse bolt hole 51 is provided through the elongated pipe 46 of hitch device 45. As clearly shown in phantom lines in FIG. 1, a locking bolt 52 is insertable through the aligned bolt holes 50 and 51, to lock the hitch bar 46 in place on the mower frame. In FIGS. 3 and 4, as well as FIG. 1, it may be seen that a stop collar 54 may be provided on pipe 46 to facilitate alignment of the bolt holes 50 and 51. Obviously, the collar 54 is more in the nature of a convenience fixture than an essential element of the hitch device. With the collar 54, pipe 46 may be simply inserted in the rear terminal end 28 of drag bar pintle 24 until the collar 54 abuts the rear terminal end 28 of the pintle to automatically dispose the bolt holes 51 in the same vertical planes as the bolt holes 50. Rotation of pipe 46 within pintle 24 serves to axially align the bolt holes 50 and 51.

It will be apparent in FIGS. 1, 3 and 4 of the drawings that the forwardmost end 48 and the rearmost end 49 of elongated member 46 are laterally offset from each other. The distance of the lateral offset is predetermined and fixed in accordance with the standard cutter bar lengths with which the hitch device is intended to be used. This will be explained in greater detail hereafter.

It will be apparent that in any of the positions shown in the drawings, the elongated pipe 46 is symmetrical relative to a horizontal plane through the center of the pipe. The cross section and symmetry of drag bar mounting pintle 24 is the same as that of the hitch pipe 46, whereby the pipe 46 may be inserted in pintle 24 right side up, so to speak, as shown in FIGS. 1 and 2 or upside down as shown in FIGS. 3 and 4 to selectively dispose the offset rear end 49 of pipe 46 to the left or right side of the front end 48. In either position, the bolt holes 50 and 51 will be aligned. A yoke member 55 is welded, or otherwise fixedly attached, to the rearmost end of hitch pipe 46. The arms of yoke 55 are provided with transversely aligned horizontal holes 56. Yoke 55, like pipe 46, is symmetrical relative to the aforementioned horizontal plane.

A connector member 58, in the form of a U-shaped strap, is welded to one end of a pivot pin 59 which is receivable in the holes 56 in yoke member 55. The pivot pin 59 may be inserted in the yoke 55 with connector member 58 disposed to either side of the rear terminal end 49 of hitch pipe 46. Spacers 60 may be provided on pivot pin 59 along either outboard side of yoke 55 to insure free pivotal movement of connector member 58 about the axis of pivot pin 59. It is desirable that connector member 58 be pivotable about this horizontal transverse axis to enable the tractor operator to raise and lower the mower base frame relative to the ground as is customary with tractor mounted mowers. The connector member 58 and pivot pin 59 are locked in place on yoke 55 by a removable latch pin 61 which is insertable through pivot pin 59 on the outboard side of the washer 60 at the end of pivot pin 59 opposite connector member 58. Connector member 58 is provided with apertures 62 to receive the hitch pin of a crop conditioner implement. Reinforcing discs 64 are preferably affixed to the upper and lower sides of connector member 58 over the hitch pin holes 62. It will be apparent in all the figures of the drawings that the hitch pin aperture 62 in connector member 58 is disposed laterally to one side of the rear terminal end 49 of hitch pipe 46 a predetermined fixed distance.

Assuming, for example, that a given implement manufacturer supplies cutterbars 32 in standard sizes of five foot, six foot, and seven foot lengths; the conditioner hitch member 46 and connector member 58 would be proportioned, so that when they are assembled as shown in FIG. 4, the conditioner hitch pin aperture 62 would be disposed, relative to the mower base frame, to locate a trailing crop conditioner implement over the center of a swath of crop material mowed by the seven foot long cutterbar on the preceding pass around the field. By inverting the conditioner hitch pipe 46 in its socket pipe 24 to the position shown in FIG. 1 of the drawings, the conditioner hitch pin aperture 62 would be relocated six inches to the right of the position shown in FIG. 4. This would properly locate the conditioner hitch pin aperture 62 for use with a cutter bar of six foot length. From the position shown in FIG. 4, the connector member 58 would be removed from the yoke 55 and inserted in the opposite side as shown in FIG. 3 to locate the conditioner hitch pin aperture six inches to the right of the location shown in FIG. 1 or twelve inches to the right of the position shown in FIG. 4. This would properly locate the hitch pin aperture to center a trailing crop conditioner over a swath mowed by a five foot long cutter bar. For a specific example, the lateral offset between the forwardmost and rearmost ends of conditioner hitch pipe 46 may be three inches and the hitch pin aperture 62 may be located six inches to the side of the center of rear terminal end 49 of pipe 46; then, in FIG. 4, the hitch pin aperture 62 would be three inches to the left of the axis of pipe 46 where the pipe 46 is mounted on the base frame cross bar 11. In the FIG. 1 assembly, the hitch pin aperture 62 would be located three inches to the right of the axis of pipe 46 at its forwardmost end 48.

In FIG. 3, the hitch pin aperture 62 would be disposed nine inches to the right of the axis of member 46 at its front end 48; or, in other words, a difference of six inches in the lateral location of hitch pin aperture 62 is afforded by the three assembly possibilities of the conditioner hitch members as shown. This corresponds to the six inch lateral difference between the centers of cutterbars of five foot, six foot, and seven foot lengths.

It is believed that the mechanical simplicity and low manufacturing cost of the above described hitch structure will be obvious from the drawings and the foregoing description. With this invention, the mower manufacturer is only required to make one conditioner hitch mechanism to serve three standard length cutterbars. The implement dealer is required to stock only one conditioner hitch assembly for all three standard length cutterbars. At the time of purchase of a mower, the single hitch assembly is merely assembled on the mower base frame in the proper manner to correspond with the length of the cutterbar.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described our invention, what we claim is:

1. In combination with a mower base frame attachable to a tractor for selectively mounting one of a number of mower cutter bars of various lengths on the tractor with the mounted cutter bar extending laterally from said base frame to mow a swath of standing crop material, hitch mechanism for trailing a crop conditioner implement behind said base frame to condition the precedingly mowed swath, said hitch mechanism comprising an elongated member extending rearwardly from said base frame and having front and rear ends laterally offset from each other a predetermined distance, means for fixedly attaching said front end of said elongated member to said base frame selectively in either a right side up or an upside down orientation to selectively dispose said laterally offset rear end portion of the member either to the right or to the left of said front end of said member, a connector member selectively positionable along either side of said elongated member at said rear end portion of the elongated member, said connector member having an aperture therethrough to receive the hitch pin of a crop conditioner implement, and pivot means mounting said connector member on said rear end portion of said elongated member for pivotal movement relative thereto about a generally horizontal axis transverse to said elongated member with said aperture disposed laterally from said rear end portion of said elongated member a distance unequal to said predetermined distance whereby said hitching mechanism may be selectively assembled on said frame in any one of a plurality of ways to laterally vary the location of the hitch pin aperture in accordance with the particular length of mower cutter bar carried by said base frame for properly centering a trailing conditioner implement relative to the swath of cut crop material upon which it operates.

2. The combination of claim 1 wherein the cross sectional configuration of at least the front end portion of said elongated member is symmetrical relative to a central horizontal plane, said means for fixedly attaching said front end portion of said elongated member to said base frame comprising a socket member on said base frame having the same cross sectional configuration and symmetry as said front end portion of said elongated member, said socket member and said elongated member being selectively mateable in either of two operative positions each of which is the inverse of the other, said elongated member and said socket member each having apertures extending transversely therethrough in position to be axially aligned with each other when said members are in either of said operative positions, and bolt means extendable through said aligned apertures to lock said member in either of said operative positions.

3. The combination of claim 1 wherein a hollow pintle is fixedly mounted on said base frame, a mower drag bar is pivotally supported on the exterior surface of said pintle, and said means for fixedly attaching said front end of said elongated member to said base frame comprises said hollow drag bar pintle, said front end of said elongated member being insertable into the hollow interior of said pintle, said elongated member and said pintle having alignable holes extending transversely therethrough, and a mmeber insertable through said aligned holes to lock said elongated member to said pintle.

4. In combination with a mower base frame attachable to a tractor for selectively mounting one of a number of mower cutter bars of various lengths on the tractor with the mounted cutter bar extending laterally from said base frame to mow a swath of standing crop material, hitch mechanism for trailing a crop conditioner implement behind said base frame to condition the precedingly mowed swath, said hitch mechanism comprising an elongated member extending rearwardly from said base frame and having front and rear ends laterally offset from each other a predetermined distance, means for fixedly attaching said front end of said elongated member to said base frame selectively in either a right side up or an upside down orientation to selectively dispose said laterally offset rear end portion of the member either to the right or to the left of said front end of said member, a connector member selectively positionable along either side of said elongated member at said rear end portion of the elongated member, said connector member having an aperture therethrough to receive the hitch pin of a crop conditioner implement, and means for mounting said connector member on said rear end portion of said elongated member with said connector member selectively disposed along either side of the rear end portion of said elongated member and said aperture disposed laterally from said rear end portion of said elongated member a distance unequal to said predetermined distance whereby said hitching mechanism may be selectively assembled on said frame in any one of a plurality of ways to laterally vary the location of the hitch pin aperture in accordance with the particular length of mower cutter bar carried by said base frame for properly centering a trailing conditioner implement relative to the swath of cut crop material upon which it operates.

References Cited

UNITED STATES PATENTS

| 2,592,269 | 4/1952 | Getz | 56—1 |
| 3,066,952 | 12/1962 | Price | 280—415 |
| 3,133,397 | 5/1964 | Halls | 56—25 |
| 3,154,902 | 11/1964 | Halls | 56—25 |

RUSSELL R. KINSEY, *Primary Examiner.*